US008787908B2

(12) United States Patent
Tavildar et al.

(10) Patent No.: US 8,787,908 B2
(45) Date of Patent: Jul. 22, 2014

(54) EFFICIENT FEMTO DISCOVERY PROTOCOL USING MACRO SYNCHRONIZATION

(75) Inventors: Saurabh Tavildar, Jersey City, NJ (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 13/290,325

(22) Filed: Nov. 7, 2011

(65) Prior Publication Data

US 2013/0115944 A1 May 9, 2013

(51) Int. Cl.
| | |
|---|---|
| *H04B 7/212* | (2006.01) |
| *H04J 3/06* | (2006.01) |
| *H04B 7/00* | (2006.01) |
| *H04W 48/12* | (2009.01) |
| *H04W 56/00* | (2009.01) |
| *H04W 84/04* | (2009.01) |

(52) U.S. Cl.
CPC .............. *H04W 48/12* (2013.01); *H04W 56/00* (2013.01); *H04W 84/045* (2013.01); *Y02B 60/50* (2013.01)
USPC ............ 455/434; 370/324; 370/503; 455/522

(58) Field of Classification Search
CPC . H04W 56/00; H04W 56/001; H04W 56/002; H04W 56/015; H04W 56/325; H04W 72/04; H04W 84/18; H04W 76/02; H04W 52/325; H04W 52/242; H04L 5/0032
USPC ......... 370/328, 350, 254, 329, 345, 503, 522, 370/502; 455/522, 422.1, 423, 414.1, 502
See application file for complete search history.

(56) References Cited

U.S. PATENT DOCUMENTS

| | | | | |
|---|---|---|---|---|
| 2006/0013160 | A1* | 1/2006 | Haartsen | 370/328 |
| 2009/0010244 | A1* | 1/2009 | Laroia et al. | 370/350 |
| 2009/0016284 | A1* | 1/2009 | Laroia et al. | 370/329 |
| 2009/0016315 | A1* | 1/2009 | Laroia et al. | 370/345 |
| 2009/0017801 | A1* | 1/2009 | Laroia et al. | 455/414.1 |
| 2010/0054237 | A1 | 3/2010 | Han et al. | |

(Continued)

FOREIGN PATENT DOCUMENTS

EP    2339892 A1    6/2011

OTHER PUBLICATIONS

Meshkati et al., "Mobility and Femtocell Discovery in 3G UMTS Networks", Qualcomm, Feb. 2010, pp. 1-8.

(Continued)

*Primary Examiner* — Nizar Sivji
(74) *Attorney, Agent, or Firm* — James K. O'Hare

(57) ABSTRACT

A method, a computer program product, and an apparatus are provided in which the apparatus (e.g., a femto cell) receives timing information from a second apparatus (e.g., a macro cell). The apparatus receives a signal from a third apparatus (e.g., a UE) based on the received timing information. The apparatus transmits a broadcast signal based on the received signal. A method, a computer program product, and an apparatus are provided in which the apparatus (e.g., a UE) receives timing information from a second apparatus (e.g., macro cell). The apparatus transmits a signal to a third apparatus (e.g., a femto cell) based on the received timing information. The apparatus receives a broadcast signal from the third apparatus in response to the signal.

24 Claims, 14 Drawing Sheets

(56) References Cited

U.S. PATENT DOCUMENTS

| | | |
|---|---|---|
| 2010/0111070 A1* | 5/2010 | Hsu .............................. 370/350 |
| 2010/0128701 A1 | 5/2010 | Nagaraja |
| 2010/0142449 A1 | 6/2010 | Chuo |
| 2010/0150109 A1* | 6/2010 | Bradley et al. ................ 370/331 |
| 2010/0165882 A1 | 7/2010 | Palanki et al. |
| 2011/0177808 A1* | 7/2011 | Grokop et al. ................ 455/423 |
| 2011/0275361 A1* | 11/2011 | Yavuz et al. ................ 455/422.1 |
| 2011/0281574 A1* | 11/2011 | Patel et al. ................. 455/422.1 |
| 2012/0142392 A1* | 6/2012 | Patel et al. .................... 455/522 |

OTHER PUBLICATIONS

International Search Report and Written Opinion—PCT/US2012/063939—ISA/EPO—Jan. 24, 2013.

\* cited by examiner

EFFICIENT FEMTO DISCOVERY PROTOCOL USING MACRO SYNCHRONIZATION

BACKGROUND

1. Field

The present disclosure relates generally to communication systems, and more particularly, to an efficient femto cell discovery protocol using synchronization from a macro cell.

2. Background

Femto cells periodically transmit broadcast signals. The signals may cause interference to nearby macro cells. Further, a user equipment (UE) may attempt to decode the signals even if the UE cannot connect to the femto cell. As such, the UE may unnecessarily consume power by attempting to decode the signals. As such, there is a need for an efficient femto cell discovery protocol that reduces interference to nearby macro cells and reduces the power consumption of UEs.

SUMMARY

In an aspect of the disclosure, a method, a computer program product, and an apparatus are provided. The apparatus may be a femto cell. The apparatus receives timing information from a second wireless device, such as a macro cell. The apparatus receives a signal from a third wireless device, such as a UE, based on the received timing information. The apparatus transmits a broadcast signal based on the received signal.

In an aspect of the disclosure, a method, a computer program product, and an apparatus are provided. The apparatus may be a UE. The apparatus receives timing information from a second wireless device, such as a macro cell. The apparatus transmits a signal to a third wireless device, such as a femto cell, based on the received timing information. The apparatus receives a broadcast signal from the third wireless device in response to the signal.

DETAILED DESCRIPTION

Figure 1:
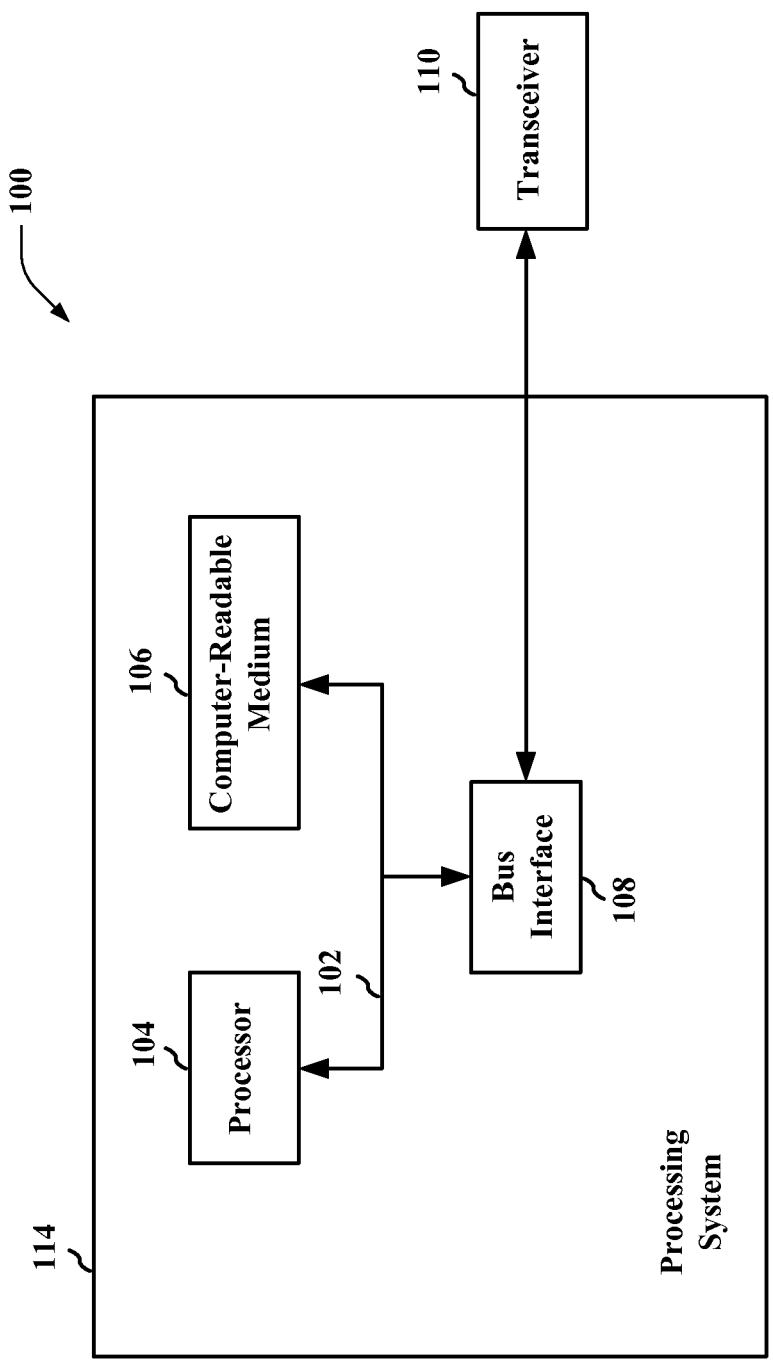
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
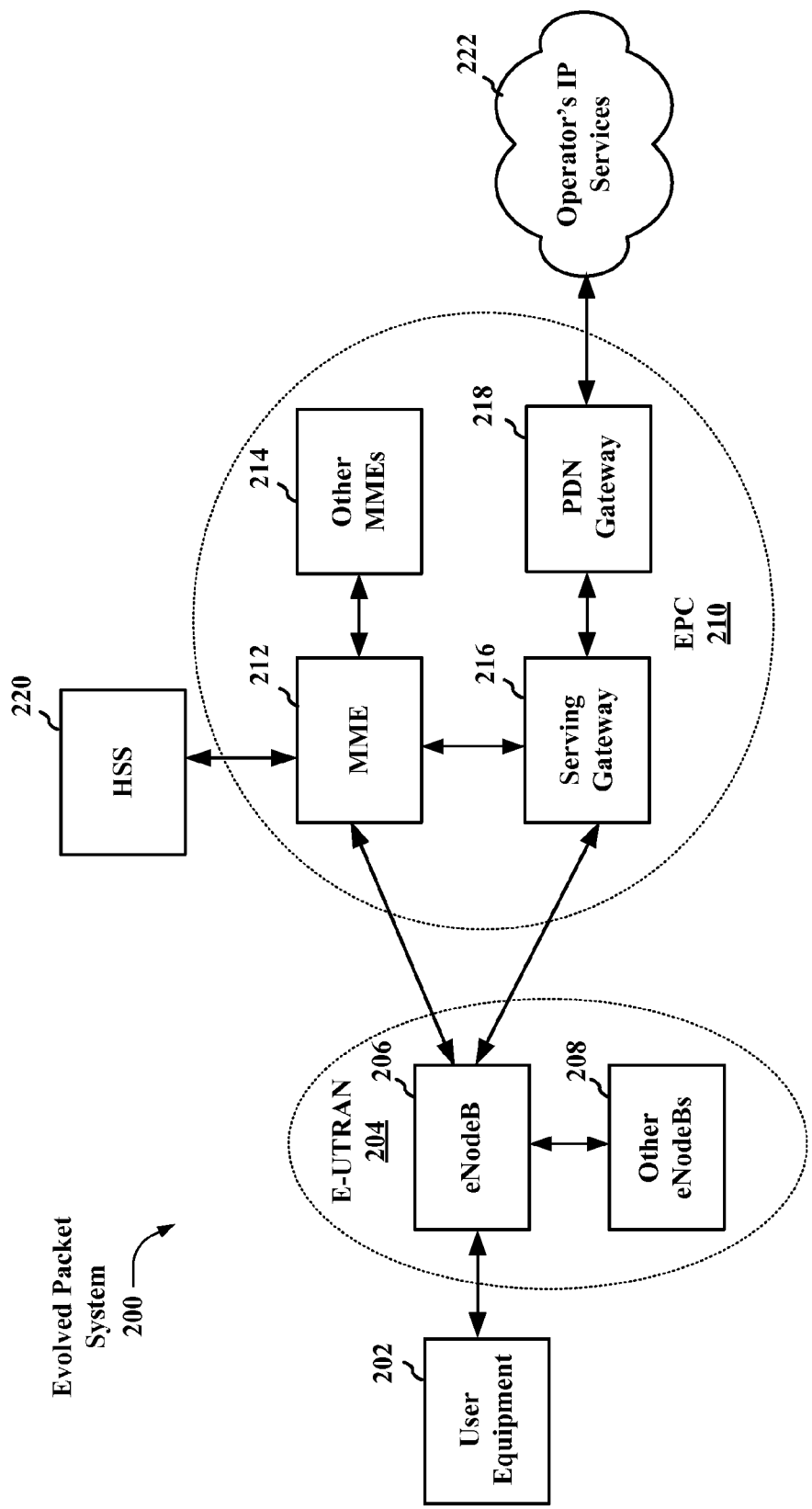
FIG. 2 is a diagram illustrating an example of a network architecture.

FIG. 2 is a diagram illustrating a Long Term Evolution (LTE) network architecture 200 employing various apparatuses 100 (see FIG. 1). The LTE network architecture 200 may be referred to as an Evolved Packet System (EPS) 200. The EPS 200 may include one or more UE 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (e.g., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

Figure 3:
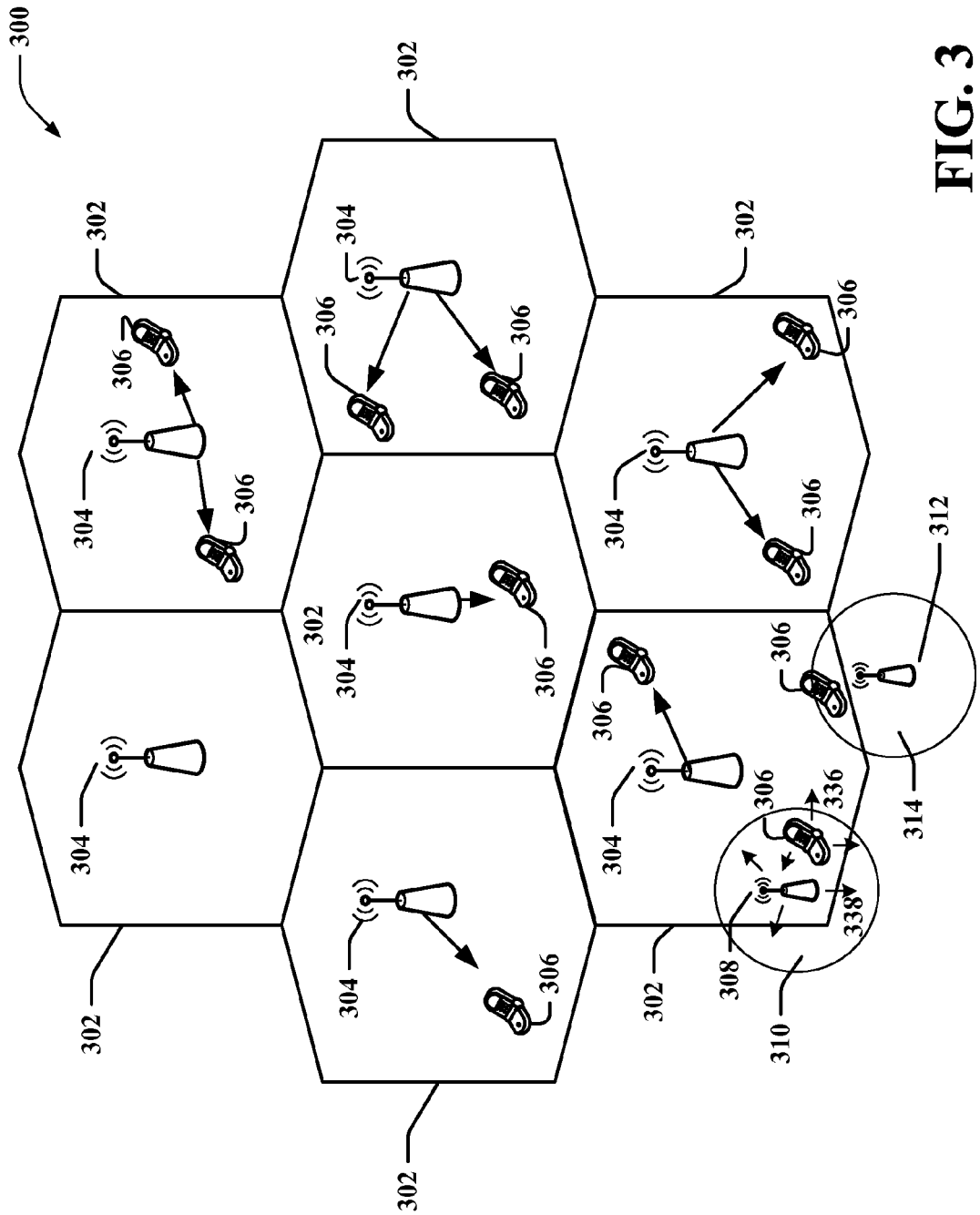
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

In one configuration, lower power class eNBs and UEs may be configured to transmit peer discovery signals. For example, as shown in FIG. 3, the lower power class eNB 308 is configured to transmit the peer discovery signal 338 and the UE 306 is configured to transmit the peer discovery signal 336. One or more of the peer discovery signals 336, 338 may be utilized in relation to broadcast signals transmitted from the lower power class eNB 308 in order to reduce unnecessary interference to the eNB 304 and/or reduce power consumption of the UE 306.

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
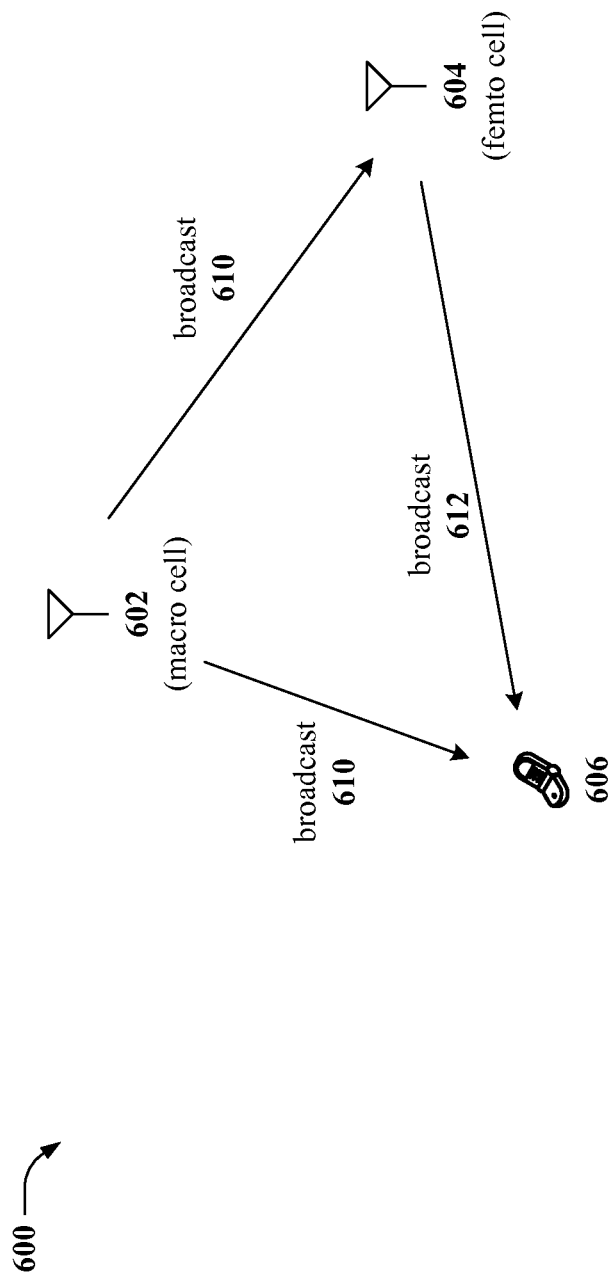
FIG. 4 is a diagram illustrating communication between a macro cell, femto cell, and a UE.

FIG. 4 is a diagram 600 illustrating communication between a macro cell, femto cell, and a UE. As shown in FIG. 4, the UE 606 and the femto cell 604 receive a broadcast signal 610 from a macro cell 602. The broadcast signal 610 includes multiple distinct signals including a synchronization signal with synchronization information, a timing signal with timing information, and a broadcast message with system information. The UE 606 also receives a broadcast signal 612 from the femto cell 604. The broadcast signal 612 includes multiple distinct signals including a synchronization signal with synchronization information, a timing signal with timing information, and a broadcast message with system information. The UE 606 may not be able to connect to the femto cell 604 or may not be close enough to the femto cell 604 to connect to the femto cell 604. In such a situation, the broadcast signal 612 transmitted by the femto cell 604 may be unnecessary and may cause unnecessary interference to the macro cell 602. Further, assuming the UE 606 is close enough to the femto cell 604 to decode the broadcast signal 612, the UE 606 may partially decode the broadcast signal 612 to determine the identity of the femto cell 604 and determine that it cannot connect to the femto cell 604. In such a situation, the UE 606 consumes power partially decoding the broadcast signal 612 from the femto cell 604 to which the UE 606 cannot connect.

Figure 5:
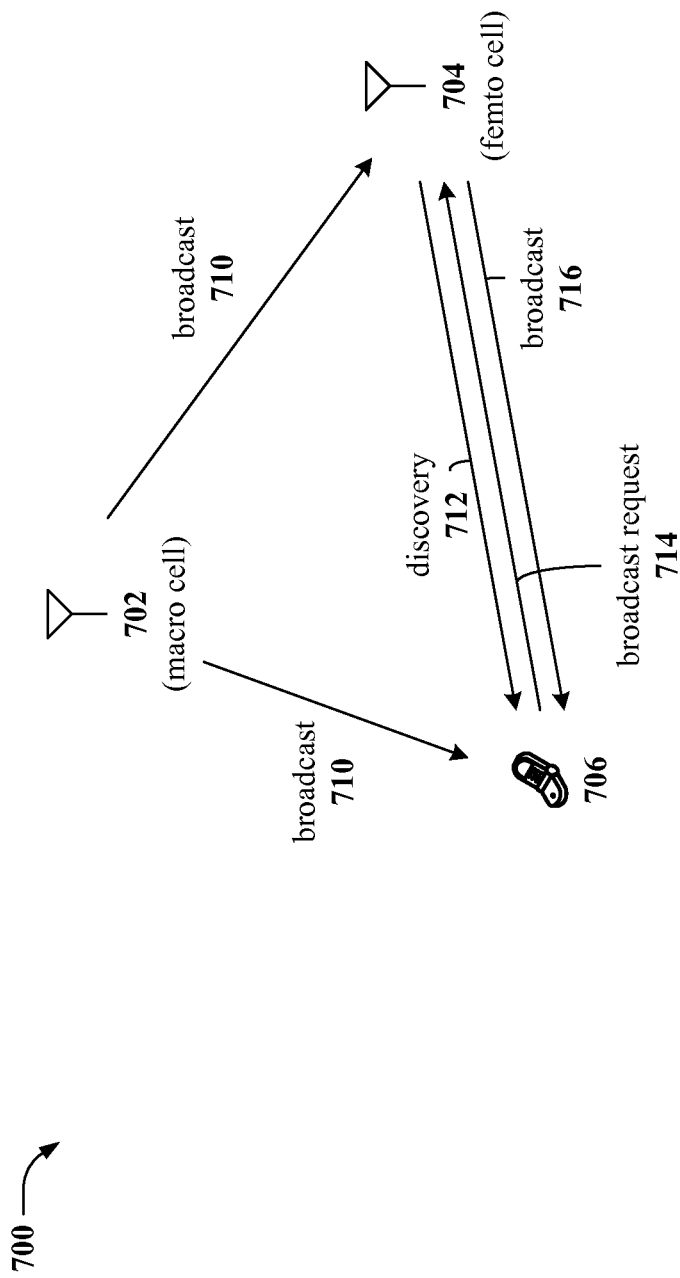
FIG. 5 is a diagram for illustrating a first exemplary method.

FIG. 5 is a diagram 700 for illustrating a first exemplary method. As shown in FIG. 5, the UE 706 and the femto cell 704 receive a broadcast signal 710 from a macro cell 702. The broadcast signal 710 includes multiple distinct signals including a synchronization signal with synchronization information, a timing signal with timing information in a master information block (MIB), and a broadcast message with system information in a system information block (SIB). Based on the synchronization and timing information from the broadcast signal 710, the femto cell 704 periodically transmits a discovery signal 712 and the UE 706 receives the discovery signal 712. The discovery signal 712 may be relatively short (e.g., 64 bits) and shorter than a typical broadcast signal. Alternatively, the discovery signal 712 may include a SIB that is normally included in a broadcast message. The UE 706 decodes the discovery signal 712 and determines the identity of the femto cell 704. Based on the identity of the femto cell 704, the UE 706 determines whether to connect to the femto cell 704. If the UE 706 determines to connect to the femto cell 704, the UE 706 transmits a broadcast request message 714 requesting a broadcast signal 716 from the femto cell 704. The broadcast signal 716 includes multiple distinct signals including a synchronization signal with synchronization information, a timing signal with timing information in a MIB, and a broadcast message with system information in a SIB. Upon receiving the broadcast request message 714, the femto cell 704 transmits the broadcast signal 716 to the UE 706. The UE 706 receives synchronization and timing information (in a MIB) in the broadcast signal 716, decodes system information (in a SIB) in the broadcast signal 716 based on the received synchronization and timing information, and communicates with the femto cell 704 based on the received synchronization, timing, and system information. The synchronization and timing communicated in the broadcast signal 716 may be different than the synchronization and timing of the macro cell 702 that is communicated in the broadcast signal 710, used by the femto cell 704 for transmitting the discovery signal 712, and used by the UE 706 for receiving the discovery signal 712. The femto cell 704 may transmit the discovery signal 712 with a first periodicity and the broadcast signal 716 with a second periodicity greater than the first periodicity. For example, the femto cell 704 may transmit the discovery signal 712 once every 10 seconds and, upon receiving a request for the broadcast signal 716, may transmit the broadcast signal 716 once every 100 ms.

Figure 6:
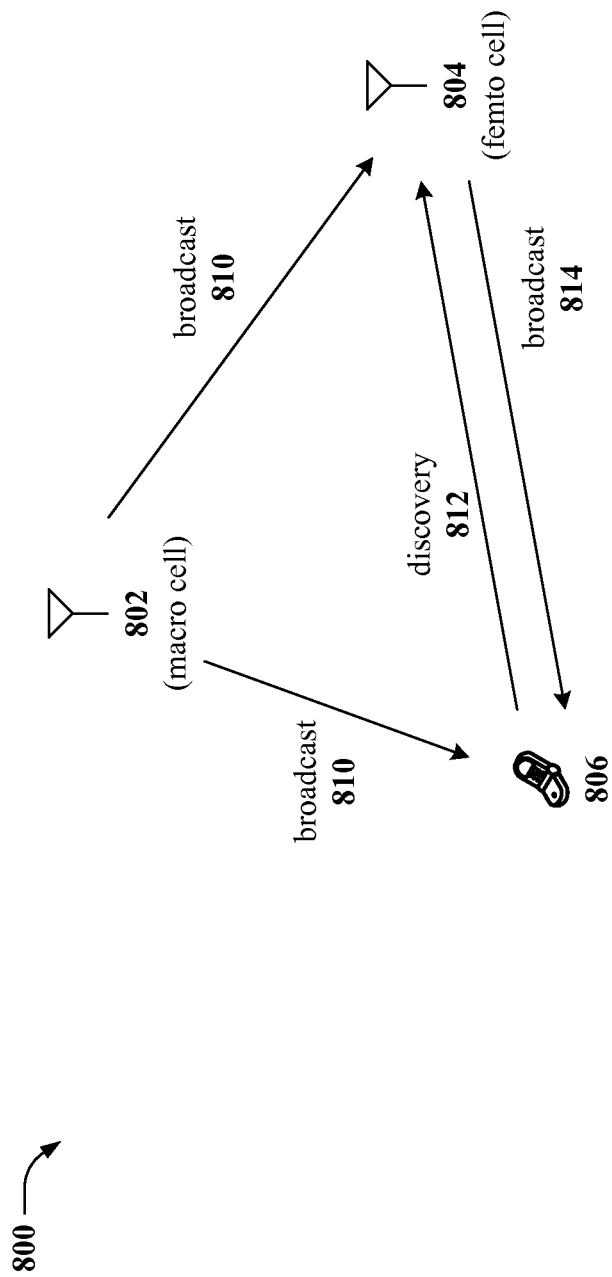
FIG. 6 is a diagram for illustrating a second exemplary method.

FIG. 6 is a diagram 800 for illustrating a second exemplary method. As shown in FIG. 6, the UE 806 and the femto cell 804 receive a broadcast signal 810 from a macro cell 802. The broadcast signal 810 includes multiple distinct signals including a synchronization signal with synchronization information, a timing signal with timing information in a MIB, and a broadcast message with system information in a SIB. Based on the synchronization and timing information from the broadcast signal 810, the UE 806 periodically transmits a discovery signal 812. The discovery signal 812 may be relatively short (e.g., 64 bits) and shorter than a typical broadcast signal. Alternatively, the discovery signal 712 may include a SIB that is normally included in a broadcast message. The femto cell 804 decodes the discovery signal 812 and determines the identity of the UE 806. Based on the identity of the UE 806, the femto cell 804 determines whether to connect to the UE 806. If the femto cell 804 determines to connect to the UE 806, the femto cell 804 transmits a broadcast signal 814 to the UE 806. The broadcast signal 814 includes multiple distinct signals including a synchronization signal with synchronization information, a timing signal with timing information in a MIB, and a broadcast message with system information in a SIB. The UE 804 receives synchronization and timing information (in a MIB) in the broadcast signal 814, decodes system information (in a SIB) in the broadcast signal 814 based on the received synchronization and timing information, and communicates with the femto cell 804 based on the received synchronization, timing, and system information. The synchronization and timing communicated in the broadcast signal 814 may be different than the synchronization and timing of the macro cell 802 that is communicated in the broadcast signal 810, used by the UE 806 for transmitting the discovery signal 812, and used by the femto cell 804 for receiving the discovery signal 812.

Figure 7:
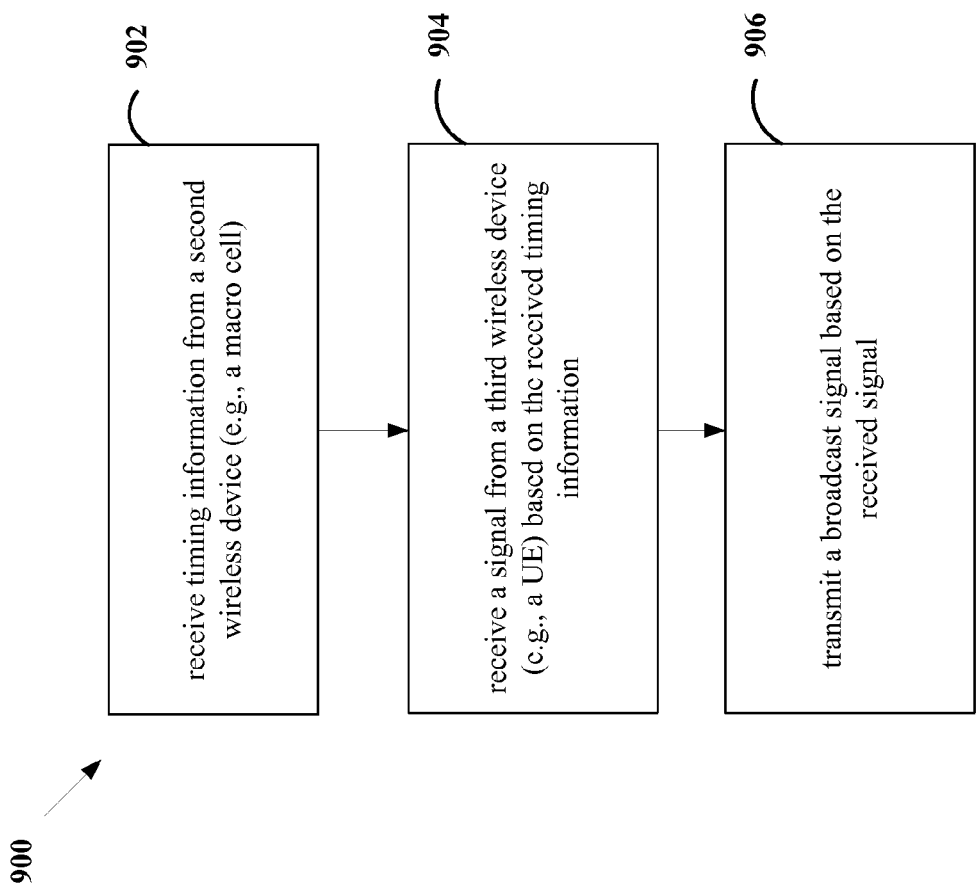
FIG. 7 is a flow chart of a first method of wireless communication.

FIG. 7 is a flow chart 900 of a first method of wireless communication. The method may be performed by a femto cell, such as the femto cell 704/804. As shown in FIG. 7, the femto cell receives timing information from a second wireless device, such as the macro cell 702/802 (902). In addition, the femto cell receives a signal from a third wireless device, such as the UE 706/806, based on the received timing information (904). Furthermore, the femto cell transmits a broadcast signal based on the received signal (906). The broadcast signal may include three separate signals including synchronization information, timing information, and system information of the femto cell.

Figure 8:
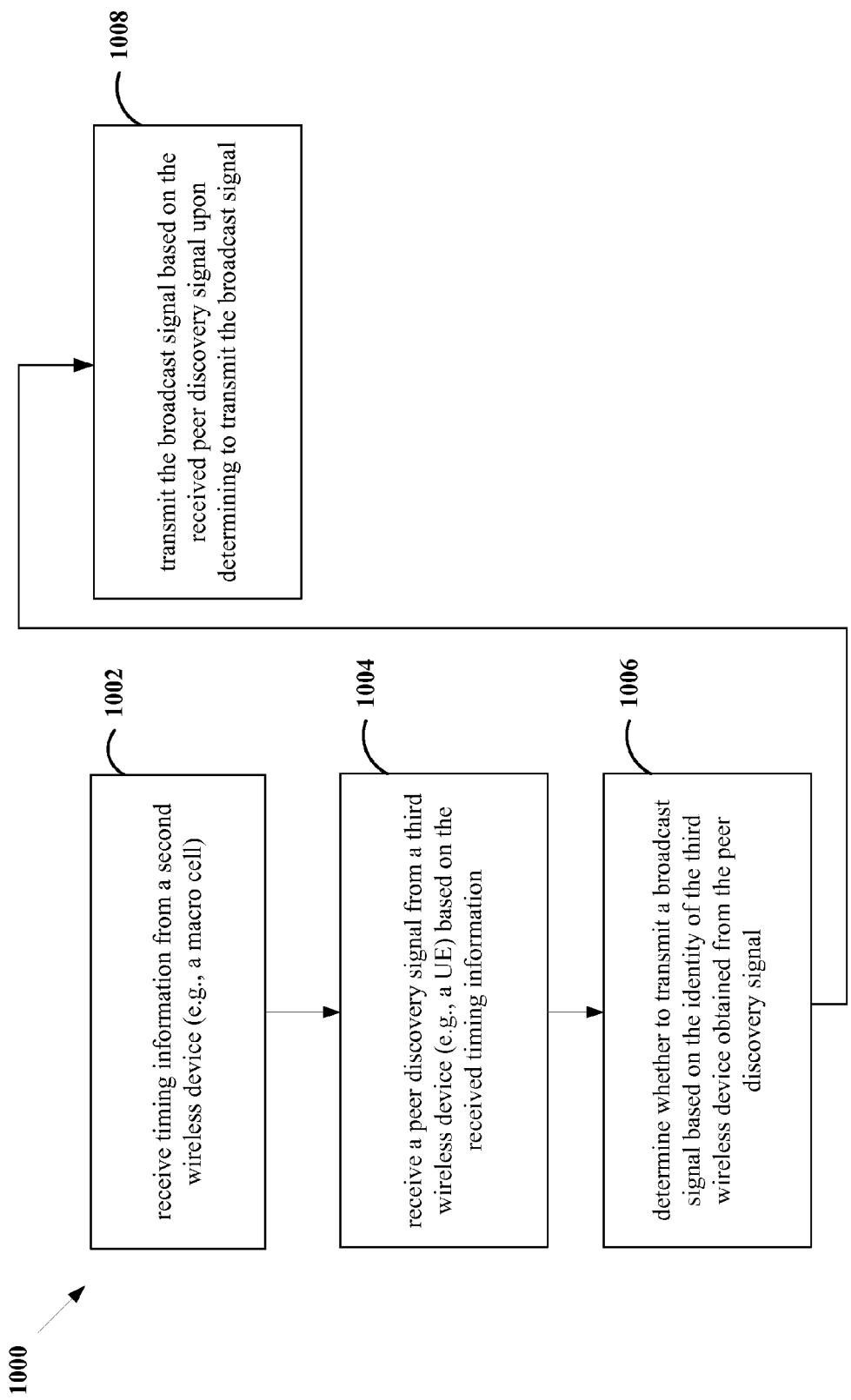
FIG. 8 is a flow chart of a second method of wireless communication.

FIG. 8 is a flow chart 1000 of a second method of wireless communication. The method may be performed by a femto cell, such as the femto cell 804. As shown in FIG. 8, the femto cell receives timing information from a second wireless device, such as the macro cell 802 (1002). In addition, the femto cell receives a peer discovery signal from a third wireless device, such as the UE 806, based on the received timing information (1004). The peer discovery signal identifies the third wireless device. The femto cell determines whether to transmit the broadcast signal based on the identity of the third wireless device obtained from the peer discovery signal (1006). The femto cell transmits a broadcast signal based on the received peer discovery signal upon determining to transmit the broadcast signal (1008).

Figure 9:
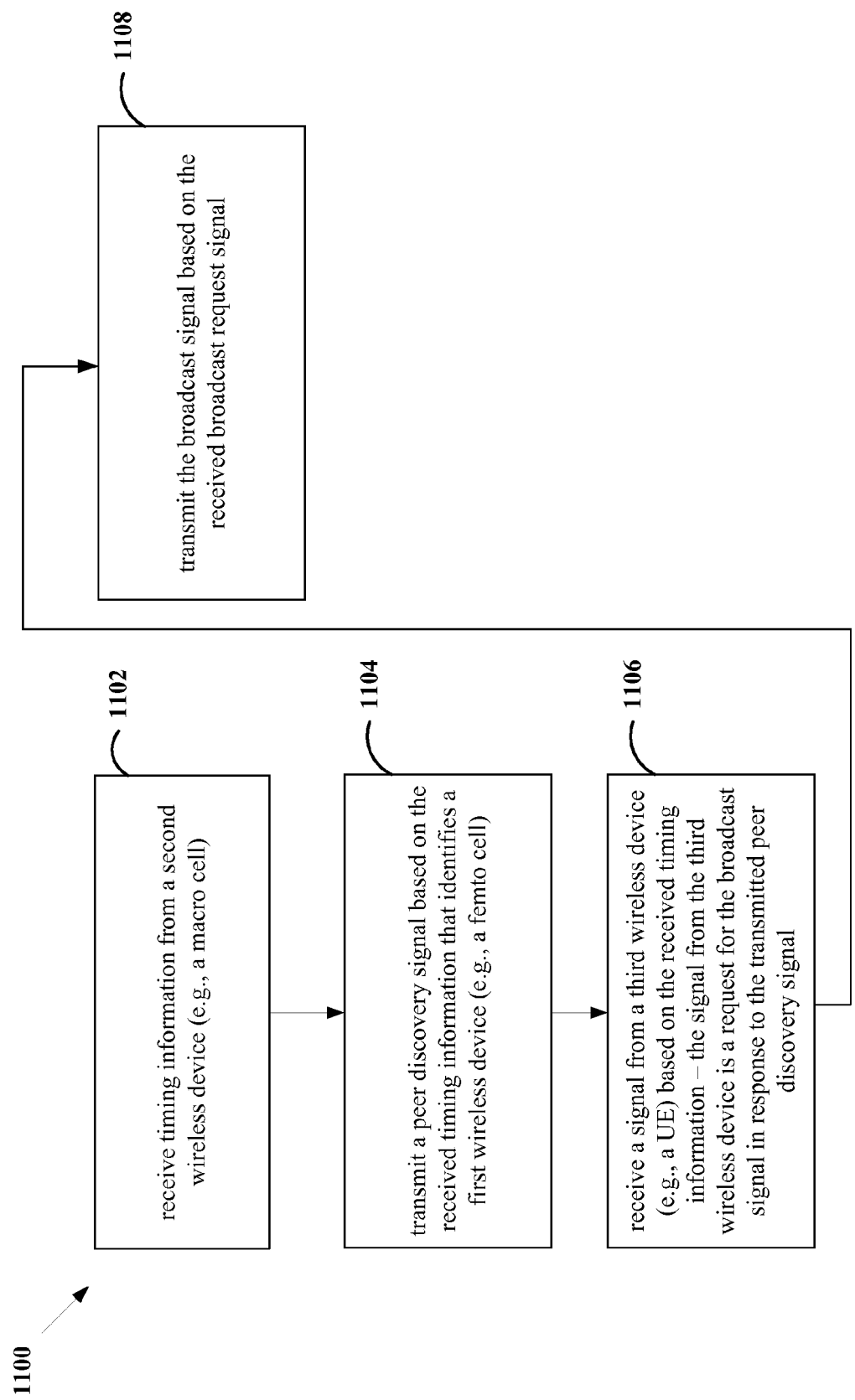
FIG. 9 is a flow chart of a third method of wireless communication.

FIG. 9 is a flow chart 1100 of a third method of wireless communication. The method may be performed by a femto cell, such as the femto cell 704. As shown in FIG. 9, the femto cell receives timing information from a second wireless device, such as the macro cell 702 (1102). The femto cell transmits a peer discovery signal based on the received timing information that identifies the femto cell (1104). The femto cell receives a signal from a third wireless device, such as the UE 706, based on the received timing information (1106). The signal from the third wireless device is a request for the broadcast signal in response to the transmitted peer discovery signal. The femto cell transmits a broadcast signal based on the received broadcast request signal (1108). The femto cell may transmit the peer discovery signal with a first periodicity and transmit the broadcast signal with a second periodicity greater than the first periodicity.

Figure 10:
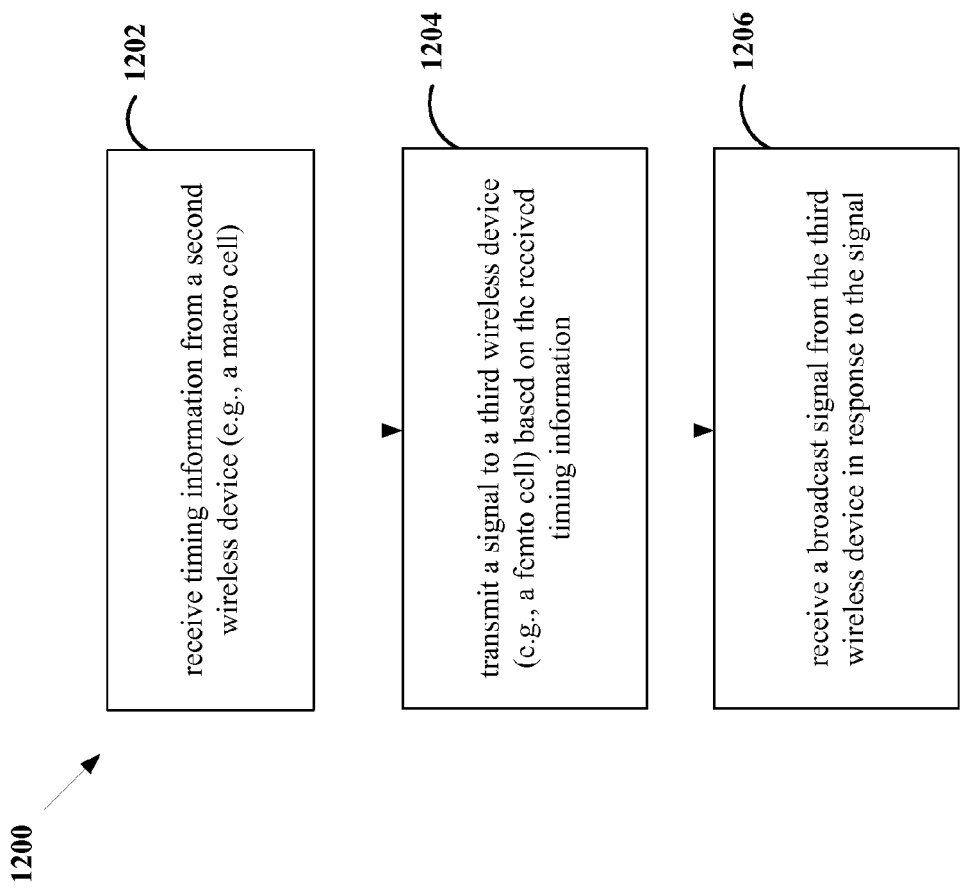
FIG. 10 is a flow chart of a fourth method of wireless communication.

FIG. 10 is a flow chart 1200 of a fourth method of wireless communication. The method may be performed by a UE, such as the UE 706/806. As shown in FIG. 10, the UE receives timing information from a second wireless device, such as the macro cell 702/802 (1202). In addition, the UE transmits a signal to a third wireless device, such as a femto cell 704/804, based on the received timing information (1204). Furthermore, the UE receives a broadcast signal from the third wireless device in response to the signal (1206). The broadcast signal may include synchronization information, timing information, and system information of the third wireless device.

Figure 11:
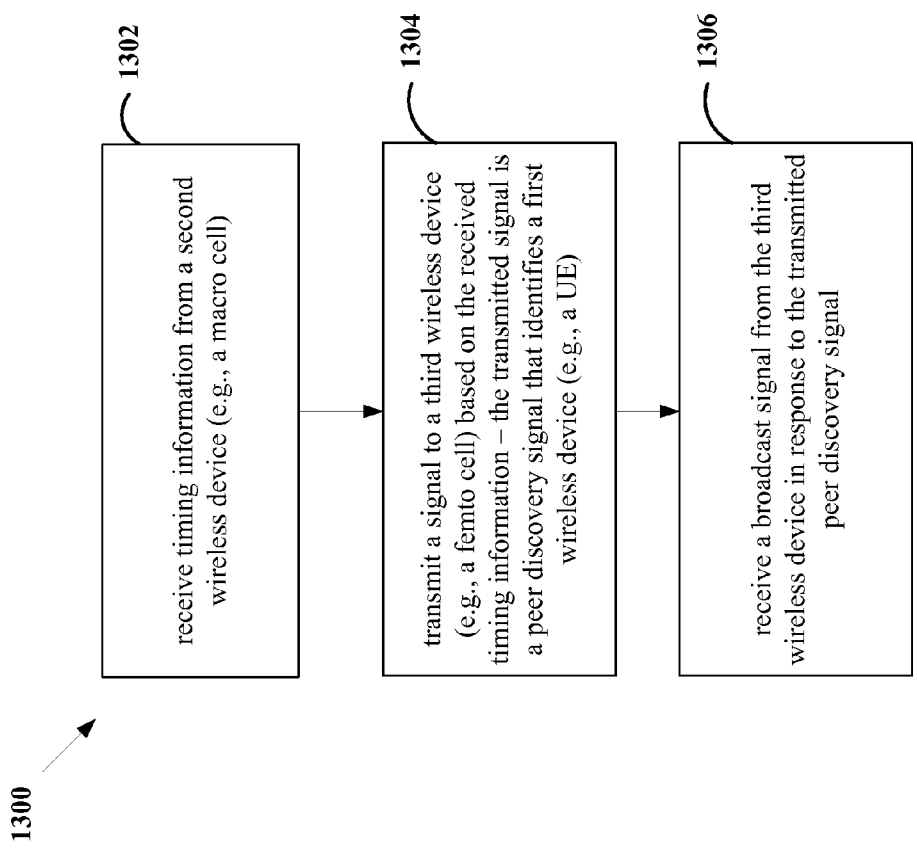
FIG. 11 is a flow chart of a fifth method of wireless communication.

FIG. 11 is a flow chart 1300 of a fifth method of wireless communication. The method may be performed by a UE, such as the UE 806. As shown in FIG. 11, the UE receives timing information from a second wireless device, such as the macro cell 802 (1302). The UE transmits a signal to a third wireless device, such as a femto cell 804, based on the received timing information (1304). The transmitted signal is a peer discovery signal that identifies the UE (1304). The UE receives a broadcast signal from the third wireless device in response to the transmitted peer discovery signal (1306).

Figure 12:
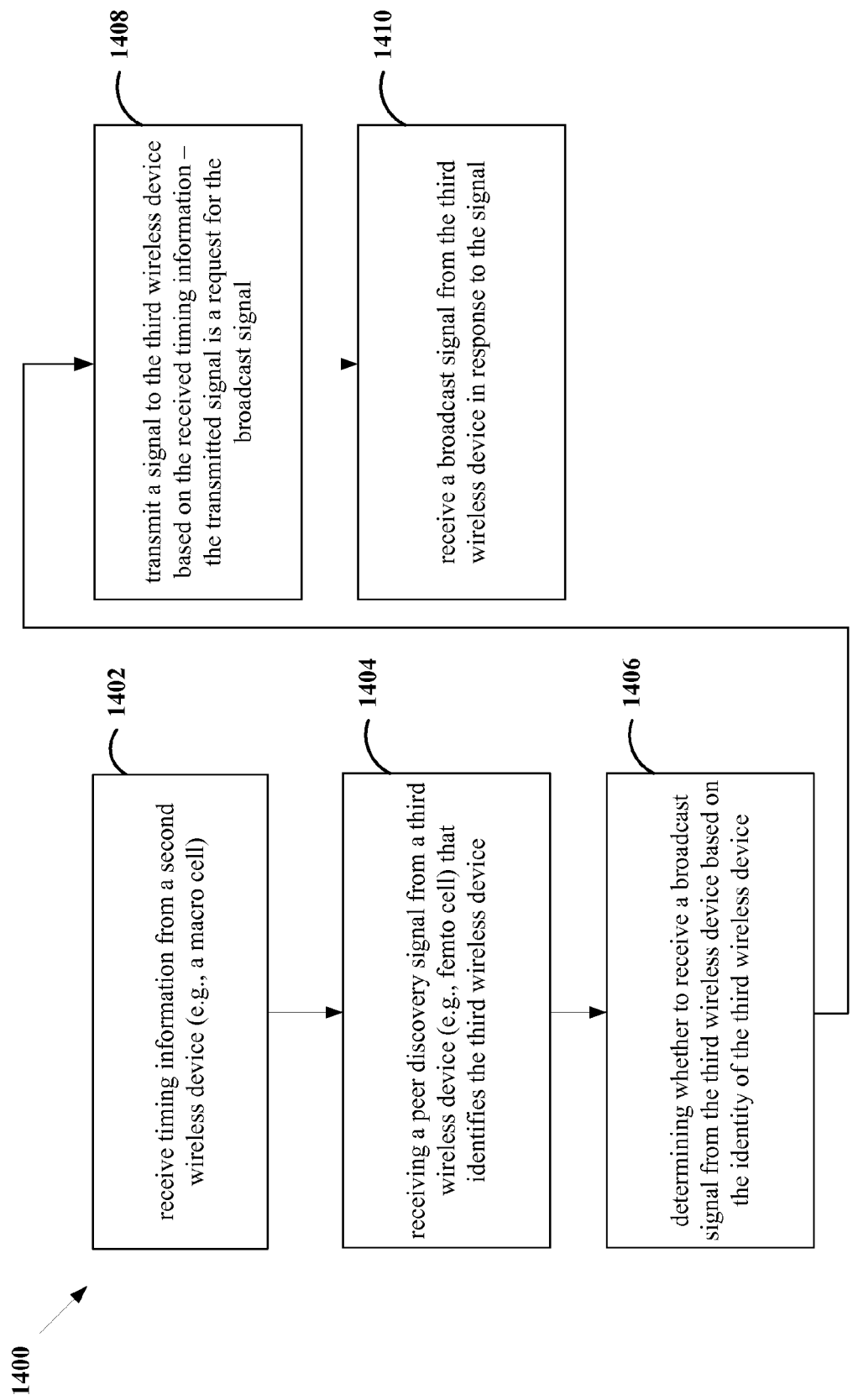
FIG. 12 is a flow chart of a sixth method of wireless communication.

FIG. 12 is a flow chart 1400 of a sixth method of wireless communication. The method may be performed by a UE, such as the UE 706. As shown in FIG. 12, the UE receives timing information from a second wireless device, such as the macro cell 702 (1402). In addition, the UE receives a peer discovery signal from a third wireless device, such as a femto cell 704, that identifies the third wireless device (1404). The UE determines whether to receive a broadcast signal from the third wireless device based on the identity of the third wireless device (1406). The UE transmits a broadcast request signal to the third wireless device based on the received timing information (1408). The UE receives a broadcast signal from the third wireless device in response to the transmitted broadcast request signal (1410).

Figure 13:
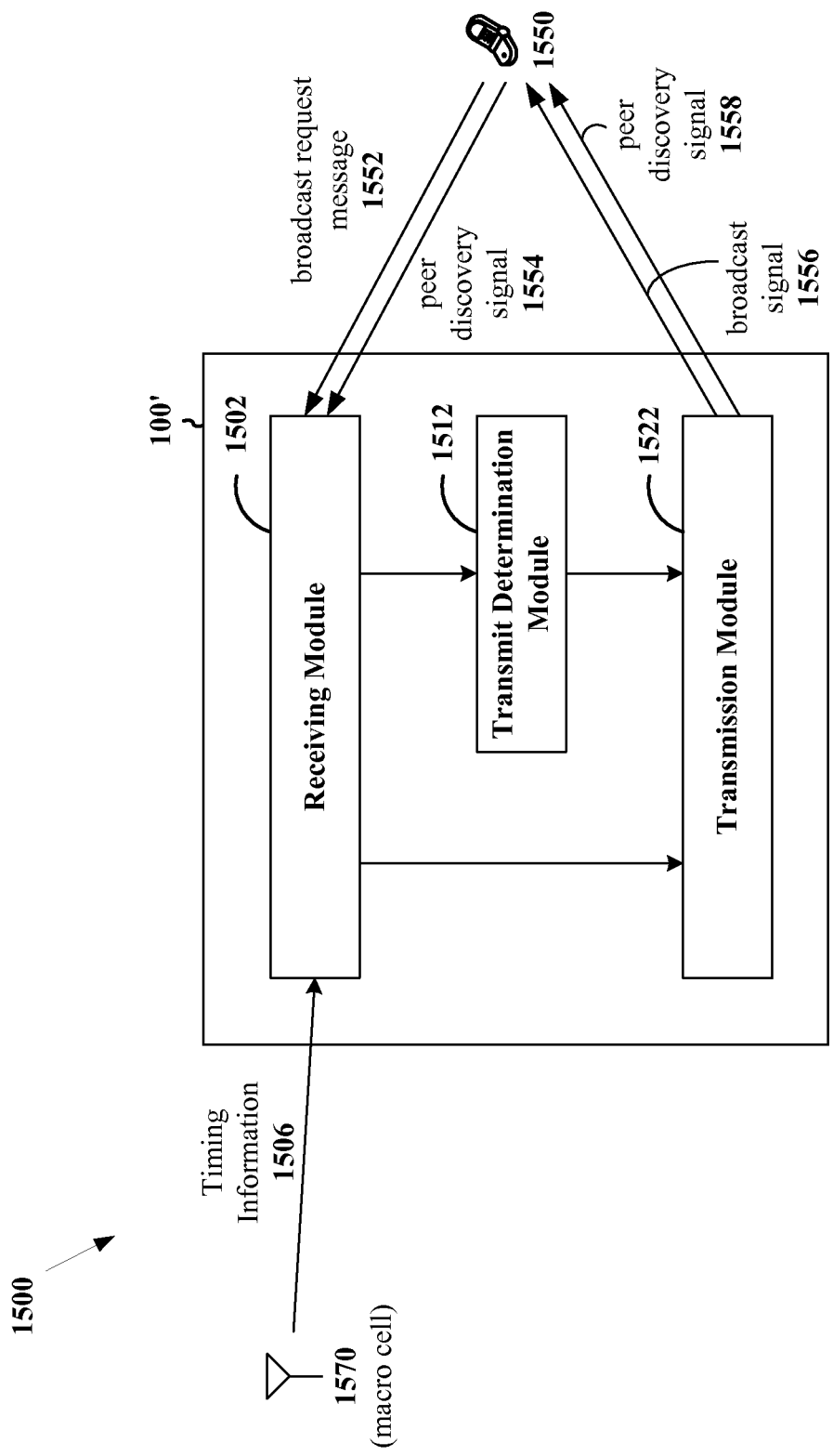
FIG. 13 is a conceptual block diagram illustrating the functionality of a first exemplary apparatus.

FIG. 13 is a conceptual block diagram 1500 illustrating the functionality of a first exemplary apparatus 100', which may be a femto cell such as the femto cell 704/804. The apparatus 100' includes a receiving module 1502 that is configured to receive timing information 1506 from a second wireless device 1570, such as a macro cell. The receiving module 1502 is also configured to receive a signal 1552/1554 from a third wireless device 1550, such as a UE, based on the received timing information. The signal may be a peer discovery signal 1554 that identifies the third wireless device 1550 or a broadcast request message 1552. The apparatus 100' further includes a transmission module 1522 that is configured to transmit a broadcast signal 1556 based on the received peer discovery signal 1554 or the broadcast request message 1552. The broadcast signal 1556 transmitted by the transmission module 1522 may include synchronization information, timing information, and system information of the apparatus 100'. The apparatus 100' may further include a transmit determination module 1512 that is configured to determine whether to transmit the broadcast signal 1556 based on the identity of the third wireless device 1550 obtained from the peer discovery signal 1554. The transmission module 1522 may also be configured to transmit a peer discovery signal 1558 based on the received timing information that identifies the apparatus 100'. The transmission module 1522 may also be configured to transmit the peer discovery signal 1558 with a first periodicity and the broadcast signal 1556 with a second periodicity greater than the first periodicity. The apparatus 100' may include additional modules that perform each of the steps in the aforementioned flow charts FIGS. 7-9. As such, each step in the aforementioned flow charts FIGS. 7-9 may be performed by a module and the apparatus 100' may include one or more of those modules.

Figure 14:
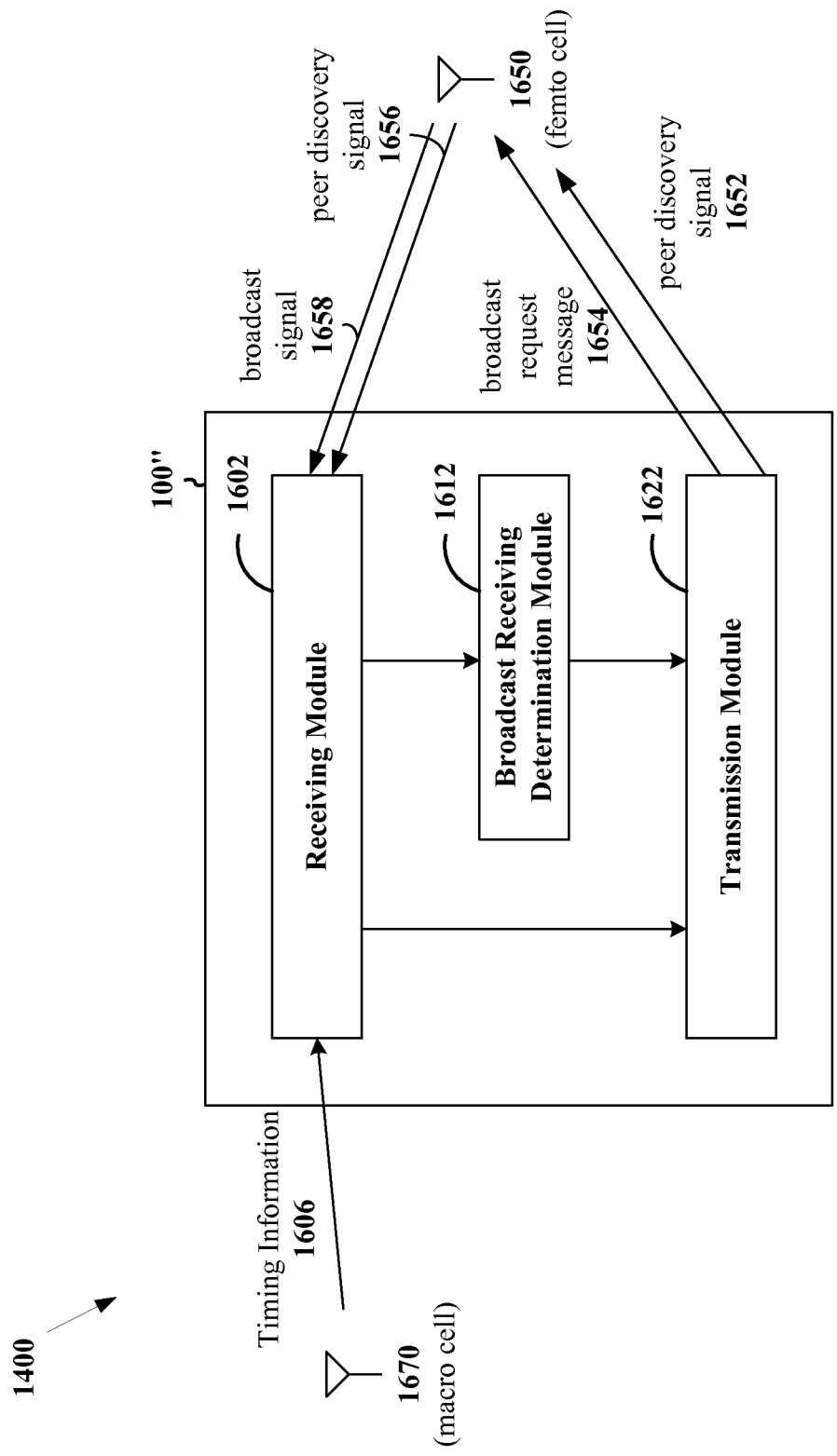
FIG. 14 is a conceptual block diagram illustrating the functionality of a second exemplary apparatus.

FIG. 14 is a conceptual block diagram 1600 illustrating the functionality of a second exemplary apparatus 100", which may be a UE such as the UE 706/806. The apparatus 100" includes a receiving module 1602 that is configured to receive timing information 1606 from a second wireless device 1670, such as a macro cell. The apparatus 100" includes a transmission module 1622 that is configured to transmit a signal 1652/1654 to a third wireless device 1650 based on the received timing information 1606. The receiving module 1602 is further configured to receive a broadcast signal 1658 from the third wireless device 1650 in response to the signal 1652/1654. The broadcast signal 1658 may include synchronization information, timing information, and system information of the third wireless device 1650. In one configuration, the transmission module 1622 is configured to transmit a peer discovery signal 1652 that identifies the apparatus 100". The receiving module 1602 may be further configured to receive a peer discovery signal 1656 from the third wireless device 1650 that identifies the third wireless device 1650. In one configuration, the transmission module 1622 is configured to transmit a broadcast request message 1654 requesting the broadcast signal 1658. In such a configuration, the apparatus 100" further includes a broadcast receiving determination module 1612 that is configured to determine whether to receive a broadcast signal 1658 from the third wireless device 1650 based on the identity of the third wireless device 1650 in the peer discovery signal 1656. The apparatus 100" may include additional modules that perform each of the steps in the aforementioned flow charts FIGS. 10-12. As such, each step in the aforementioned flow charts FIGS. 10-12 may be performed by a module and the apparatus 100" may include one or more of those modules.

Referring to FIG. 1 and FIG. 13, in one configuration, the apparatus 100/100' for wireless communication includes means for receiving timing information from a second apparatus, means for receiving a signal from a third apparatus based on the received timing information, and means for transmitting a broadcast signal based on the received signal. In one configuration, the signal received from the third apparatus is a peer discovery signal that identifies the third apparatus, and the apparatus further includes means for determining whether to transmit the broadcast signal based on the identity of the third apparatus obtained from the peer discovery signal. In one configuration, the apparatus further includes means for transmitting a peer discovery signal based on the received timing information that identifies the apparatus. In such a configuration, the signal from the third apparatus is a request for the broadcast signal in response to the transmitted peer discovery signal. The aforementioned means may be the processing system 114 and/or the modules within the apparatus 100' configured to perform the functions recited by the aforementioned means.

Referring to FIG. 1 and FIG. 14, in one configuration, the apparatus 100/100" for wireless communication includes means for receiving timing information from a second apparatus, means for transmitting a signal to a third apparatus based on the received timing information, and means for receiving a broadcast signal from the third apparatus in response to the signal. In one configuration, the apparatus further includes means for receiving a peer discovery signal from the third apparatus that identifies the third apparatus, and means for determining whether to receive a broadcast signal from the third apparatus based on the identity of the third apparatus. In such a configuration, the transmitted signal is a request for the broadcast signal. The aforementioned means may be the processing system 114 and/or the modules within the apparatus 100" configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a femto cell, comprising:
   receiving timing information from a macro cell;
   receiving a signal from a user equipment (UE) based on the same timing information received from the macro cell, the signal being a peer discovery signal that identifies the UE;
   determining whether to transmit a broadcast signal based on the identity of the UE obtained from the peer discovery signal; and
   transmitting the broadcast signal based on the determination, wherein the broadcast signal comprises synchronization information, timing information, and system information of the femto cell.

2. A method of operating a femto cell, comprising:
   receiving timing information from a macro cell;
   transmitting a peer discovery signal based on the received timing information, the peer discovery signal identifying the femto cell;
   receiving a signal from a user equipment (UE) based on the same timing information received from the macro cell, wherein the signal from the UE is a request for the broadcast signal in response to the transmitted peer discovery signal; and
   transmitting a broadcast signal based on the received signal, wherein the broadcast signal comprises synchronization information, timing information, and system information of the femto cell.

3. The method of claim 2, wherein the peer discovery signal is transmitted with a first periodicity and the broadcast signal is transmitted with a second periodicity greater than the first periodicity.

4. A method of a user equipment (UE), comprising:
   receiving timing information from a macro cell;
   receiving a peer discovery signal from a femto cell that identifies the femto cell;
   determining whether to receive a broadcast signal from the femto cell based on the identity of the femto cell;
   transmitting a signal to the femto cell based on the determination and based on the same timing information received from the macro cell; and
   receiving the broadcast signal from the femto cell in response to the signal transmitted to the femto cell, wherein the broadcast signal comprises synchronization information, timing information, and system information of the femto cell.

5. The method of claim 4, wherein the transmitted signal is a request for the broadcast signal.

6. A method of a user equipment (UE), comprising:
   receiving timing information from a macro cell;
   transmitting a signal to a femto cell based on the same timing information received from the macro cell, wherein the transmitted signal is a peer discovery signal that identifies the UE; and
   receiving a broadcast signal from the femto cell in response to the signal transmitted to the femto cell, wherein the broadcast signal comprises synchronization information, timing information, and system information of the femto cell.

7. An apparatus for wireless communication, comprising:
   means for receiving timing information from a macro cell;
   means for receiving a signal from a user equipment (UE) based on the same timing information received from the macro cell, the signal being a peer discovery signal that identifies the UE;

means for determining whether to transmit a broadcast signal based on the identity of the UE obtained from the peer discovery signal; and means for transmitting the broadcast signal based on the determination, wherein the apparatus is a femto cell and the broadcast signal comprises synchronization information, timing information, and system information of the femto cell.

8. An apparatus for wireless communication of a femto cell, comprising:

means for receiving timing information from a macro cell;

means for transmitting a peer discovery signal based on the received timing information, the peer discovery signal identifying the femto cell;

means for receiving a signal from a user equipment (UE) based on the same timing information received from the macro cell, wherein the signal from the UE is a request for the broadcast signal in response to the transmitted peer discovery signal; and means for transmitting a broadcast signal based on the received signal, wherein the broadcast signal comprises synchronization information, timing information, and system information of the femto cell.

9. The apparatus of claim 8, wherein the peer discovery signal is transmitted with a first periodicity and the broadcast signal is transmitted with a second periodicity greater than the first periodicity.

10. An apparatus for wireless communication, comprising:

means for receiving timing information from a macro cell;

means for receiving a peer discovery signal from a femto cell that identifies the femto cell;

means for determining whether to receive a broadcast signal from the femto cell based on the identity of the femto cell;

means for transmitting a signal to the femto cell based on the determination and based on the same timing information received from the macro cell; and means for receiving the broadcast signal from the femto cell in response to the signal transmitted to the femto cell, wherein the apparatus is a user equipment (UE) and the broadcast signal comprises synchronization information, timing information, and system information of the femto cell.

11. The apparatus of claim 10, wherein the transmitted signal is a request for the broadcast signal.

12. An apparatus for wireless communication of a user equipment (UE), comprising:

means for receiving timing information from a macro cell;

means for transmitting a signal to a femto cell based on the same timing information received from the macro cell, wherein the transmitted signal is a peer discovery signal that identifies the UE; and means for receiving a broadcast signal from the femto cell in response to the signal transmitted to the femto cell, wherein the broadcast signal comprises synchronization information, timing information, and system information of the femto cell.

13. An apparatus for wireless communication, comprising:
a processing system configured to:
receive timing information from a macro cell;
receive a signal from a user equipment (UE) based on the same timing information received from the macro cell, the signal being a peer discovery signal that identifies the UE;

determine whether to transmit a broadcast signal based on the identity of the UE obtained from the peer discovery signal; and transmit the broadcast signal based on the determination, wherein the apparatus is a femto cell and the broadcast signal comprises synchronization information, timing information, and system information of the femto cell.

14. An apparatus for wireless communication of a femto cell, comprising:
a processing system configured to:
receive timing information from a macro cell;
transmit a peer discovery signal based on the received timing information, the peer discovery signal identifying the femto cell;
receive a signal from a user equipment (UE) based on the same timing information received from the macro cell, wherein the signal from the UE is a request for the broadcast signal in response to the transmitted peer discovery signal; and
transmit a broadcast signal based on the received signal, wherein the broadcast signal comprises synchronization information, timing information, and system information of the femto cell.

15. The apparatus of claim 14, wherein the peer discovery signal is transmitted with a first periodicity and the broadcast signal is transmitted with a second periodicity greater than the first periodicity.

16. An apparatus for wireless communication, comprising:
a processing system configured to:
receive timing information from a macro cell;
receive a peer discovery signal from a femto cell that identifies the femto cell;
determine whether to receive a broadcast signal from the femto cell based on the identity of the femto cell;
transmit a signal to the femto cell based on the determination and based on the same timing information received from the macro cell; and
receive the broadcast signal from the femto cell in response to the signal transmitted to the femto cell,
wherein the apparatus is a user equipment (UE) and the broadcast signal comprises synchronization information, timing information, and system information of the femto cell.

17. The apparatus of claim 16, wherein the transmitted signal is a request for the broadcast signal.

18. An apparatus for wireless communication of a user equipment (UE), comprising:
a processing system configured to:
receive timing information from a macro cell;
transmit a signal to a femto cell based on the same timing information received from the macro cell, wherein the transmitted signal is a peer discovery signal that identifies the UE; and
receive a broadcast signal from the femto cell in response to the signal transmitted to the femto cell, wherein the broadcast signal comprises synchronization information, timing information, and system information of the femto cell.

19. A computer program product in a femto cell, comprising:
a non-transitory computer-readable medium comprising code for:
receiving timing information from a macro cell;
receiving a signal from a user equipment (UE) based on the same timing information received from the macro cell, the signal being a peer discovery signal that identifies the UE;

determining whether to transmit a broadcast signal based on the identity of the UE obtained from the peer discovery signal; and transmitting the broadcast signal based on the determination, wherein the broadcast signal comprises synchronization information, timing information, and system information of the femto cell.

20. A computer program product in a femto cell, comprising:

a non-transitory computer-readable medium comprising code for:

receiving timing information from a macro cell;

transmitting a peer discovery signal based on the received timing information, the peer discovery signal identifying the femto cell;

receiving a signal from a user equipment (UE) based on the same timing information received from the macro cell, wherein the signal from the UE is a request for the broadcast signal in response to the transmitted peer discovery signal; and transmitting the broadcast signal based on the received signal, wherein the broadcast signal comprises synchronization information, timing information, and system information of the femto cell.

21. The computer program product of claim 20, wherein the peer discovery signal is transmitted with a first periodicity and the broadcast signal is transmitted with a second periodicity greater than the first periodicity.

22. A computer program product in a user equipment (UE), comprising:

a non-transitory computer-readable medium comprising code for:

receiving timing information from a macro cell;

receiving a peer discovery signal from a femto cell that identifies the femto cell;

determining whether to receive a broadcast signal from the femto cell based on the identity of the femto cell;

transmitting a signal to the femto cell based on the determination and based on the same timing information received from the macro cell; and receiving the broadcast signal from the femto cell in response to the signal transmitted to the femto cell, wherein the broadcast signal comprises synchronization information, timing information, and system information of the femto cell.

23. The computer program product of claim 22, wherein the transmitted signal is a request for the broadcast signal.

24. A computer program product in a user equipment (UE), comprising:

a non-transitory computer-readable medium comprising code for:

receiving timing information from a macro cell;

transmitting a signal to a femto cell based on the same timing information received from the macro cell, wherein the transmitted signal is a peer discovery signal that identifies the UE; and receiving a broadcast signal from the femto cell in response to the signal transmitted to the femto cell, wherein the broadcast signal comprises synchronization information, timing information, and system information of the femto cell.

\* \* \* \* \*